Figure 1:
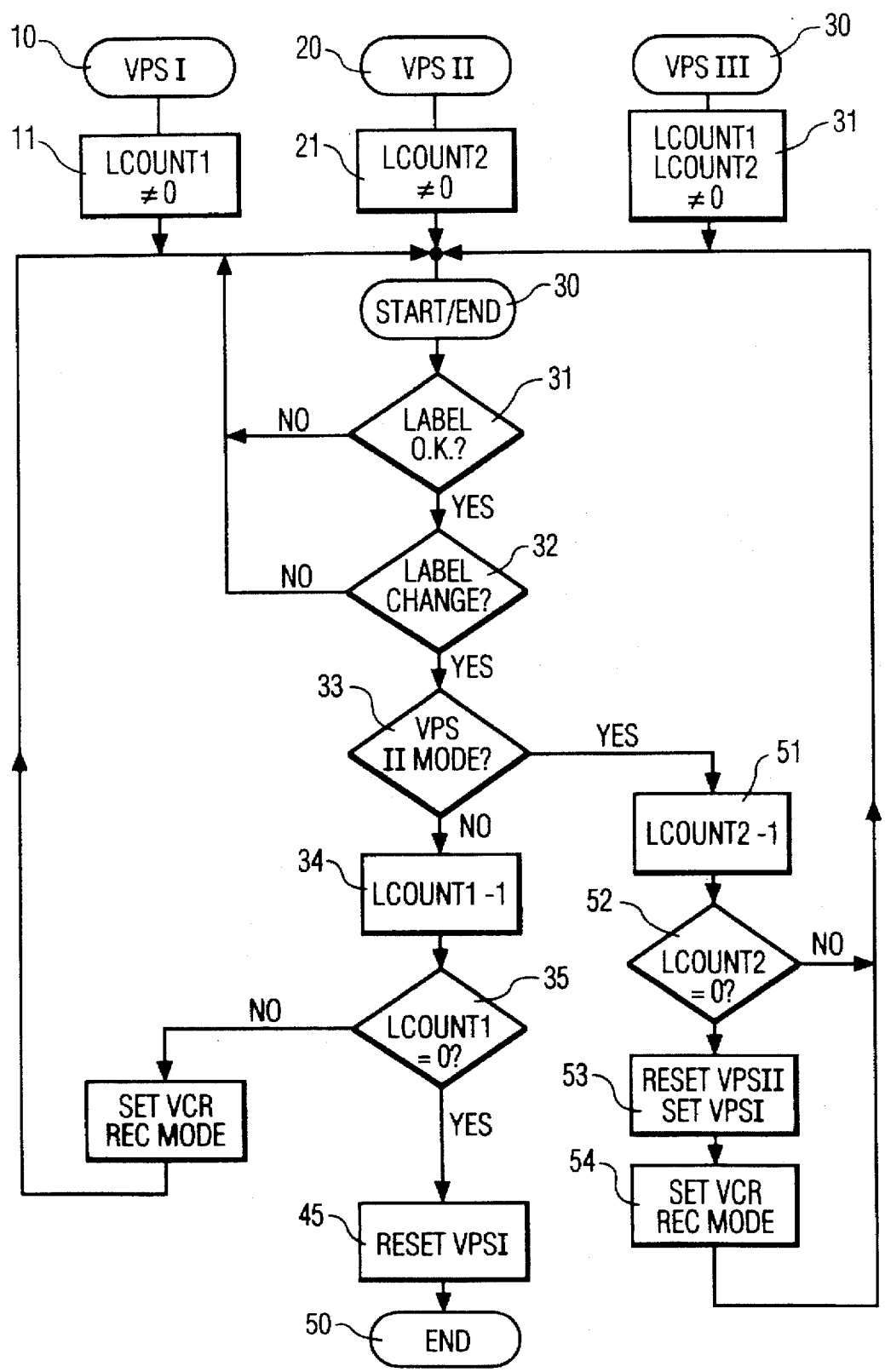

United States Patent [19]
Storz et al.

[11] Patent Number: 5,701,593
[45] Date of Patent: Dec. 23, 1997

[54] METHOD AND MEANS FOR THE TRANSMITTER-SIDE CONTROLLER OPERATION OF A RECEIVER-SIDE DEVICE

[75] Inventors: Achim Storz, Triberg; Norbert Eigeldinger, Villingen, both of Germany

[73] Assignee: Deutsche Thomson-Brandt GmbH, Villingen-Schwenningen, Germany

[21] Appl. No.: 491,684

[22] Filed: May 2, 1995

Related U.S. Application Data

[63] Continuation of Ser. No. 836,308, Apr. 24, 1992, abandoned.

[30] Foreign Application Priority Data

Aug. 25, 1989 [DE] Germany .............. 3928188.4

[51] Int. Cl.$^6$ ..................................... H04B 1/00
[52] U.S. Cl. ........................................ 455/70; 455/6.3
[58] Field of Search ...................... 455/2, 4.1, 6.1, 455/6.2, 6.3, 70; 358/335; 360/27, 33.1, 69; 348/4, 7, 9, 10; 386/46, 83

[56] References Cited

U.S. PATENT DOCUMENTS

| | | | |
|---|---|---|---|
| 4,864,429 | 9/1989 | Eigeldinger et al. | 455/4 |
| 4,879,611 | 11/1989 | Fukui et al. | 360/69 |
| 4,885,579 | 12/1989 | Sandbank | 358/86 |
| 4,891,703 | 1/1990 | Noudan | 358/142 |
| 4,908,707 | 3/1990 | Kinghorn | 358/142 |

FOREIGN PATENT DOCUMENTS 8701001  2/1987  WIPO.

OTHER PUBLICATIONS

Specifications of the Radio Data System RDS for VHF/FM Sound Broadcasting, Tech. 3244-E, Mar., 1984.
Technical Rules ARD/ZDF, Nr. 8R2—Video Programme System.

*Primary Examiner*—Reinhard J. Eisenzopf
*Assistant Examiner*—Marsha D. Banks-Harold
*Attorney, Agent, or Firm*—Joseph S. Tripoli; Peter M. Emanuel; Frederick A. Wein

[57] ABSTRACT

In known processes for controlling a receiver-side appliance, data concerning the identification signal of a program being received are derived automatically from the identification signal transmitted together with the program. The aim of the invention is to allow a program received after the program currently being received to be programmed in a receiver-side appliance without having to input manually individual essential data of the identification signal. According to the present invention, a first identification signal received when a receiver-side control device is activated and a predetermined number of subsequent, different identification signals are counted together and stored automatically in the data contained in the identification signals concerning the identification signal received when the predetermined number is reached and/or the previously received identification signal and the first identification signal. The present device is usable in television, radio receivers, recording appliances for television or radio signals.

15 Claims, 2 Drawing Sheets

METHOD AND MEANS FOR THE TRANSMITTER-SIDE CONTROLLER OPERATION OF A RECEIVER-SIDE DEVICE

This is a continuation of application Ser. No. 836,308, filed Apr. 24, 1992 abandoned.

The invention concerns a method for the operation of a device on the receiver side controlled from the station side in a predetermined operating mode by means of characteristic signals individually assigned to broadcasts (programs) Further, the invention concerns a control system on the receiver side for the execution of the method.

This sort of method and/or control system serves, for example, to render possible a correct recording of the broadcast characterized by the characteristic signal. The characteristic signal is transmitted as supplementary information to the sound and/or video signal, perhaps via a so-called sub-carrier, a so-called data line in the video signal or similar.

A control system of the type mentioned above is known from DE-A1-35 28 467 with which the characteristic signal data of a currently received broadcast need not be inputted by hand but, on the contrary, the data is automatically extracted from the characteristic signal transmitted with the broadcast. A device controlled in this manner stays in a predetermined operating mode, for example, in the recording mode for a video recorder, for the exact length of time that this characteristic signal is present.

However, if a user does not want to record a currently received broadcast but rather just the next or following broadcast then, for the purpose of station-controlled recording mode, the user must, nevertheless, with the above cited prior art known control system, individually manually input the data required for the characteristic signal into the programming section of the video recorder.

It is the task of the present invention to devise a method and/or a control means of the type mentioned above through which it is rendered possible for the user to pre-program a device on the receiver side for a station-controlled operation in a simple manner for a broadcast later than the broadcast being currently received without the user needing to separately input the required data of the assigned characteristic signal of the desired broadcast.

The method and control system according to the invention offer the advantage that reading or typing errors which often appear with the manual input of relatively extensive data are mainly avoided. For the input of data for an imminent or impending broadcast the user does not need to concern himself firstly, with the location of the characteristic signal assigned to the desired broadcast, for example, VPS data published in the radio magazines, nor does he need to take the trouble to input the complete information. He must only confirm up to how many broadcasts after the broadcast being currently received his interest lies (either to record all broadcasts up to that point or to start recording at that point): the programming of the appropriate characteristic signal data then happens automatically.

In developing the invention further it is planned that with the number to be inputted for the particular broadcast which is—corresponding to this number—received after the currently received broadcast can be automatically programmed. For example, if the next or just the next broadcast is to be programmed then merely the number "1" or "2" respectively need be inputted.

The input number serves instead to determine how many broadcasts directly after the current received broadcast should be automatically programmed.

Further advantageous developments of the invention are described in the sub-claims.

Further advantages, features and particulars of the invention follow from the subsequent description of an embodiment example by means of the drawing. Thereby shows:

FIG. 1 a flow chart of an embodiment example of the invention-type method and

Figure 2:
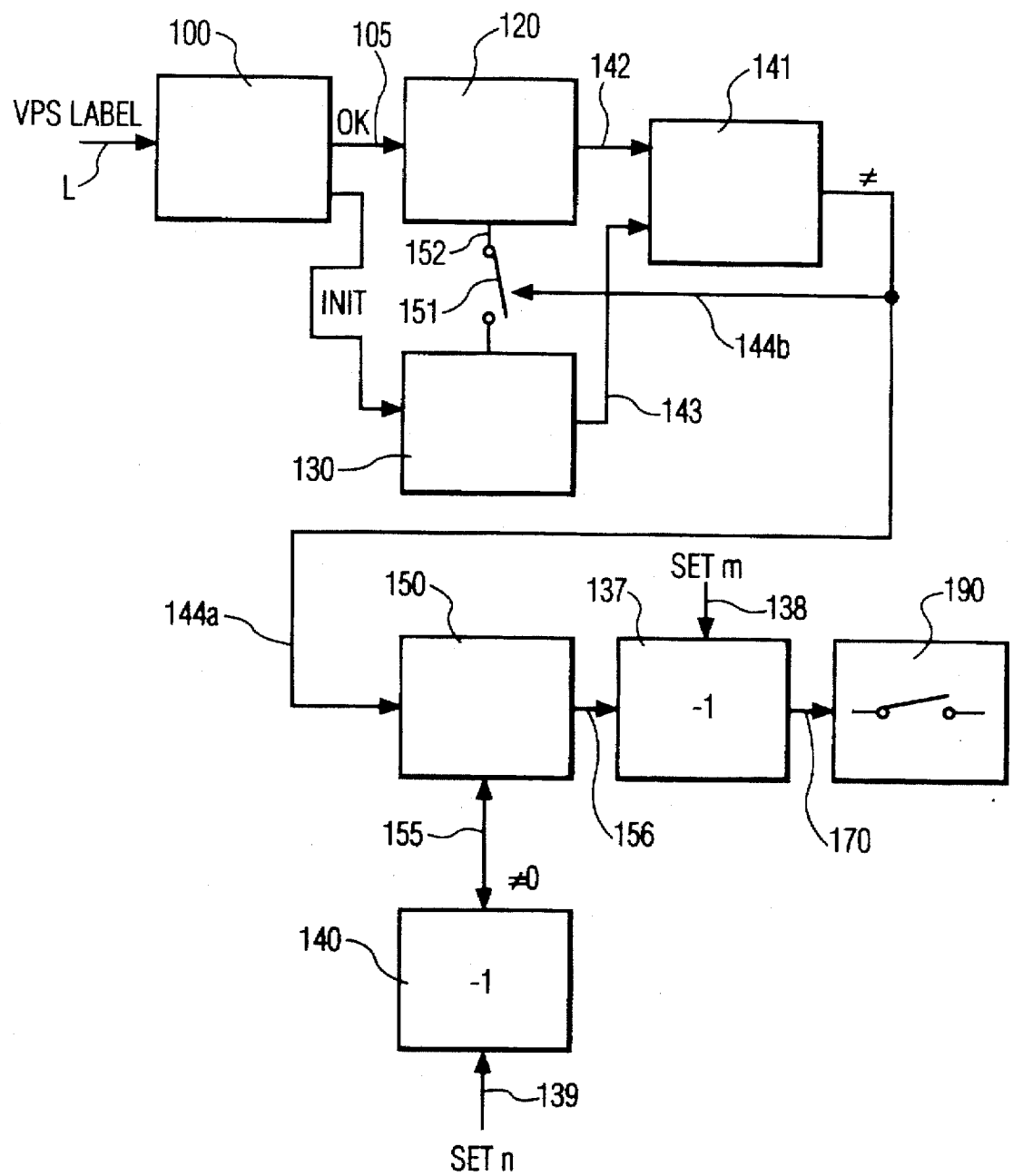

FIG. 2 a block circuit diagram, in a very much simplified presentation, of an embodiment example of a receiver-side control means according to the invention.

The flow chart according to the invention-type method presented in FIG. 1 shows an embodiment example with which the method finds an application in a video recorder which is otherwise not illustrated. This video recorder is corresponding, for example, with the Technical Recommendation No. 8 R 2 (edition 2, April 1987) of the broadcasting organizations under public law of the Federal Republic of Germany—provided with station-side controlled operation of the recording mode by means of VPS characteristics.

The user has the choice between three VPS-controlled recording modes: VPS I, VPS II and VPS III, whose output points 10, 20 or 30 are schematically represented.

Upon invoking the VPS I mode the user is prompted, at point 11, to set a first counter LCOUNT1 on a natural number, for example, "m", (consequently not equal to zero) in order to register the fact that he desires the recording of the next m broadcasts following the currently received broadcast.

If instead, the user invokes VPS II mode then the user is prompted, at point 21, to set a second counter LCOUNT2 on a natural number, for example, "n", in order to register the fact that he desires the recording of the nth broadcast following from the currently received broadcast.

Operation of VPS III mode represents a combination of the other two modes; when this VPS III mode is called then the user is prompted, at a point 31, to input the natural numbers m and n for the counters LCOUNT1 and LCOUNT2 respectively in order to register the fact that he desires the recording of m successive following broadcasts from the nth broadcast following the currently received broadcast.

Equally valid, no matter which of the three modes is selected, is the continuation of the method which is symbolically indicated at point 30 with "START/END". Here, VPS characteristics received on the selected frequency are determined and decoded and then (31, "LABEL OK?") checked for plausibility according to the VPS standard. If here no correct VPS characteristic is recognized ("NO" branching) then it rebounds to point 30; this can happen several times until the process is abandoned after a predetermined number of jumps.

In the other case ("YES" branching) a check occurs at point 32 ("LABEL CHANGE?") to see whether the VPS characteristic has altered since the last pass through this point 32. If this is not the case then it is also rebounded back from here to point 30 although this time, without the supplementary condition that the process is to be abandoned after a predetermined number of jumps: a plausible VPS characteristic is indeed present and consequently, these jumps are entirely "welcome".

However, if the VPS characteristic has altered since the last check was carried out at point 32 then a branching to a point 33 ("VPS II MODE?") now occurs where a check is made whether the process works in the VPS II mode (whereby at this point also, an activation of the VPS III mode is counted as working in the VPS II mode).

If this is not the case—i.e. it works in VPS I mode—then in the next step at a position 34 the status of the counter LCOUNT1 is reduced by one and, following that (35), checked to see whether it has now reached the value zero. If the answer is negative the video recorder is switched into the recording mode at a point 40 or—in case it is already in this mode—is left in that condition and then a jump back to point 30 occurs.

If instead, it is determined at point 35 that the counter LCOUNT1 has reached the value zero then a jump to a point 45 ("RESET VPS I") occurs at which the switching of the video recorder into VPS I mode is cancelled and following that, the process is terminated at a point 50 ("END").

If, at point 33, the question of working in VPS II mode is answered in the affirmative then a jump from here to a point 51 occurs where the status of the counter LCOUNT2 is reduced by one and, following that (52), is checked to see whether it has now reached the value zero. If this is not the case then a jump back to point 30 ("START/END") occurs.

In the other case the switching of the video recorder into VPS II mode is cancelled at a position 53 ("RESET VPS II, SET VPS I") and it is switched into VPS I mode. Afterwards (54), it is switched into the recording mode and following that, rebounded to point 30 ("START/END"). The video recorder now works for the remainder of the process in VPS I mode like as described before.

Of course it is understood that all the preceding inquiries, decision steps and the like, so far as nothing else positive is confirmed, happen automatically.

An embodiment example of an invention-type control system on the receiver side is presented in FIG. 2 as a block circuit diagram and is, likewise, a part of an otherwise not-illustrated video recorder which works according to the method described for FIG. 1.

Upon activation of one of the VPS modes: VPS I, VPS II or VPS III, a VPS characteristic ("VPS LABEL") fed to a comparator 100 via a line L is checked for plausibility by means of the established criteria in the VPS standard. If the VPS characteristic corresponds to the standard then it is transmitted via a line 105 to a memory 120. On starting the comparison process the VPS characteristic is correctly recognized for the first time and simultaneously transmitted via a line INIT to a memory 130.

The user can set a broadcast counter 137 on to the number m of broadcasts to be recorded by means of a non-illustrated keyboard which is connected to the broadcast counter 137 via a line 138. Similarly, the user can set a waiting counter 140 via a line 139 on to the number of broadcasts which should be ignored before the start of the recording mode.

A comparator 141 is connected to the memory 120 via a line 142 and to the memory 130 via a line 143; the respective memory contents (120 or 130) are fed via these wires (142, 143) to the comparator where they are constantly compared with each other. If a dissimilarity is determined by the comparator then it outputs, via lines 144a, 144b, a switching voltage to a comparator 150 or, respectively, to a switch which thus closes a line 152 leading from the memory 120 to the memory 130 and thereby, renders possible the transmission of the VPS characteristic contained in the memory 120 to the memory 130. Simultaneously, the comparator 150 checks, via a line 155, whether the waiting counter 140 stands at zero. If this is the case then the broadcast counter 137 receives the command, via a line 156, to decrement by one.

If the broadcast counter 137 is thereby set to a value less than zero then, via a line 170, it outputs a switching voltage to a switching means 190 which then switches the video recorder to STOP (=end of recording); if the broadcast counter 137 has a value greater than or equal to zero then the video recorder is switched to RECORD (=recording active). If the waiting counter 140 does not stand at zero then it is decremented by one.

We claim:

1. A method for controlling the operation of a device on the receiver side in a predetermined operating mode by means of characteristic signals provided by broadcasts comprising the steps of:

transmitting the characteristic signals assigned to the broadcasts during the entire duration of the respective broadcasts, different broadcasts having different characteristic signals, comparing of the characteristic signals successively, with each other and/or with a first characteristic signal, counting the number of characteristic signals which are different from each other according to said step of comparing, determining the subsequent characteristic signal for which a predetermined number of changes of characteristic signals is reached in response to said counting and comparing steps, and storing and operating upon data contained in the subsequent characteristic signal.

2. The method according to claim 1, wherein the device is switched into the predetermined operating mode for the first time since receiving the first characteristic signal and after the predetermined number of characteristic signals has been reached and remains in said operating mode so long as the characteristic signal containing the predetermined number of characteristic signals is received.

3. The method according to claim 1, wherein the device is switched into the predetermined operating mode for the first time immediately upon receiving the first characteristic signal and remains therein until a predetermined number is reached so long as the first characteristic signal, the following characteristic signals, and the characteristic signal received on attainment of the predetermined number are respectively received.

4. The method according to claim 1, wherein the characteristic signals are received according to VPS standards or RDS standards.

5. The method according to claim 1, wherein the comparison refers to data contained in the respective characteristic signals.

6. The method according to claim 1 wherein the device is not yet switched into the predetermined operating mode during the reception of the first characteristic signal.

7. The method according to claim 1 wherein interrupts one of the operations occurring in the device on the receiver side in the predetermined operating mode if a characteristic signal characterizing an interruption or disturbance from the station side is received and that hereafter, it causes a new operation of the device on the receiver side in the predetermined operational mode upon reception of the renewal of the characteristic signal received directly before the interruption or disturbance.

8. A control system for the execution of the method according to claim 1 wherein the device includes a memory which, from the activation of the control system, automatically contains ruling data, which is contained in the first characteristic signal, and ruling data, which is contained in a characteristic signal following the first characteristic signal, and data, which is contained in a characteristic signal following a latter one; and (b) has a comparator which completely or partly compares the data stored according to each other; and (c) has a counter which counts the number of characteristic signals established as different according to (b) and gives a release signal upon reaching the predetermined number; and (d) has a coincidence facility which is activated by the release signal and stays active as long as the characteristic signal received upon activation is received, and through which the device is switched into the predetermined operating mode so long as the coincidence facility stays active; and (e) has a cut-off facility, which is activated by the release signal, which receives from the coincidence facility a signal which characterizes the end of the activity of the coincidence facility and then switches off the control system.

9. The control system according to claim 8, wherein the coincidence facility can also be activated by a characteristic signal received before reaching the predetermined number.

10. The control system according to claim 9 wherein the device on the receiver side is a recording device, and the predetermined operating mode is the recording mode.

11. The control system according to claim 9 wherein the device on the receiver side is a broadcast receiver, and the predetermined operating mode is the reproduction mode of the device.

12. The control system according to claim 11 wherein a switch is provided for the fast initiation of the recording mode the operation of which also activates the control system.

13. The control system according to claim 12 wherein the predetermined number is established by the number of further quick successive following operations of the switch followed by a first operation of the switch through operation of a number keyboard.

14. The control system according claim 13 wherein the input can occur whether the predetermined number refers to the number of broadcasts to let pass before the device is to be switched into the predetermined operating mode, or whether it refers to the number of operating sections to be carried out in the device in the predetermined operating mode.

15. The control system according to claim 14 wherein, with regard to reaching the predetermined number of different characteristic signals, only such characteristic signals are allowed which concern characteristic signals that are assigned by the transmitter to broadcasts in an individually characterizing way and to which the following characteristic signals according to the VPS standard do not belong: status characteristic signals, interruption characteristic signals or interference afflicted characteristic signals.

\* \* \* \* \*

UNITED STATES PATENT AND TRADEMARK OFFICE
CERTIFICATE OF CORRECTION

PATENT NO. : 5,701,563
DATED : 23 Dec 1997
INVENTOR(S) : FUKUDA et al

It is certified that error appears in the above-identified patent and that said Letters Patent is hereby corrected as shown below:

<u>Fig. 7</u>, just above the reference numeral "32", replace "30" with --36--.

<u>Column 15</u>, line 63, change "developing" to --toner supplying--.

<u>Column 17</u>, line 17, change "developing" to --toner supplying--.

<u>Column 18</u>, line 1, change "developing" to --toner supplying--.

<u>Column 18</u>, line 36, change "developing" to --toner supplying--.

Signed and Sealed this

Twenty-sixth Day of October, 1999

*Attest:*

Q. TODD DICKINSON

*Attesting Officer*     Acting Commissioner of Patents and Trademarks